June 30, 1953 D. H. JONES 2,643,480
TRAP
Filed Feb. 27, 1948 3 Sheets-Sheet 1
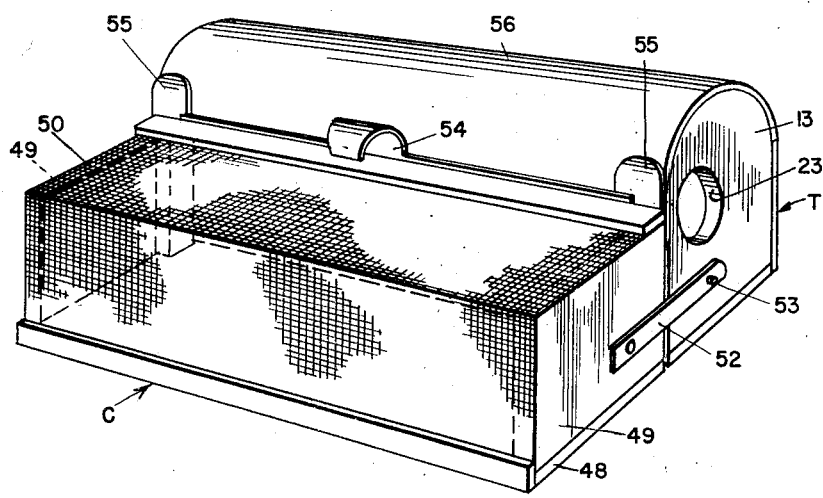
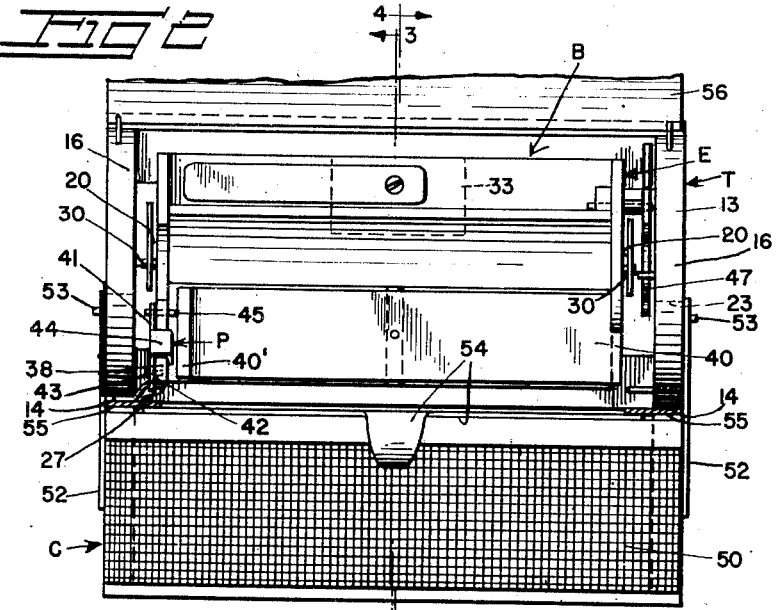
INVENTOR.
Dan J. Jones
BY Wilfred E. Lawson
ATTORNEY June 30, 1953 D. H. JONES 2,643,480
TRAP
Filed Feb. 27, 1948 3 Sheets-Sheet 2
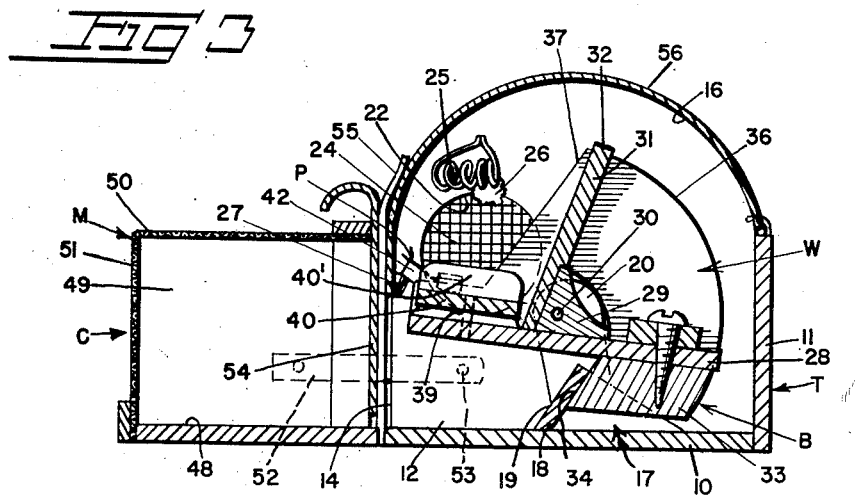
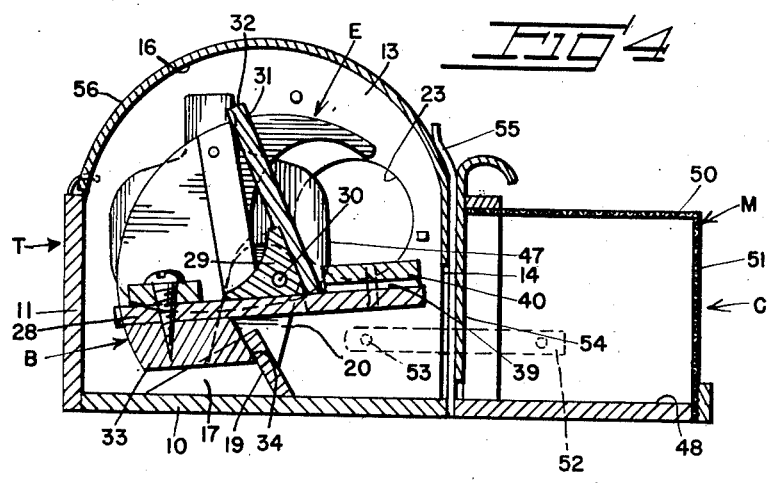
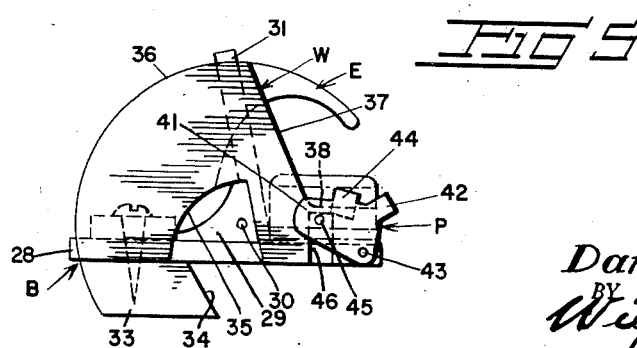
INVENTOR.
Dan J. Jones
BY
Wilfred E. Lawson
ATTORNEY

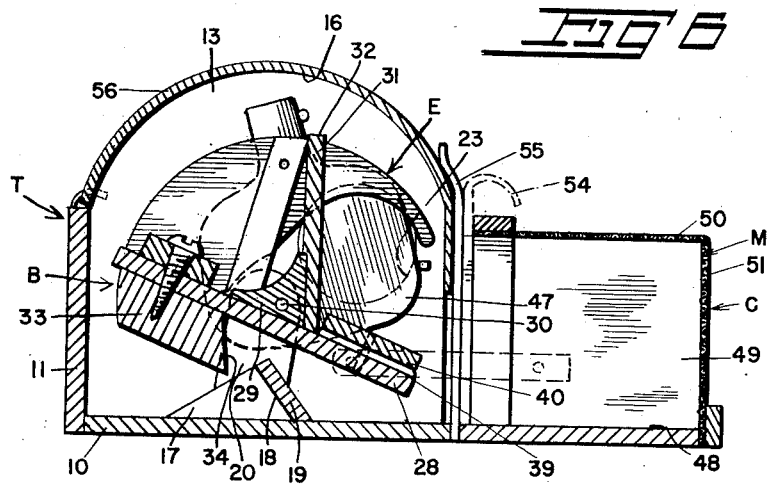
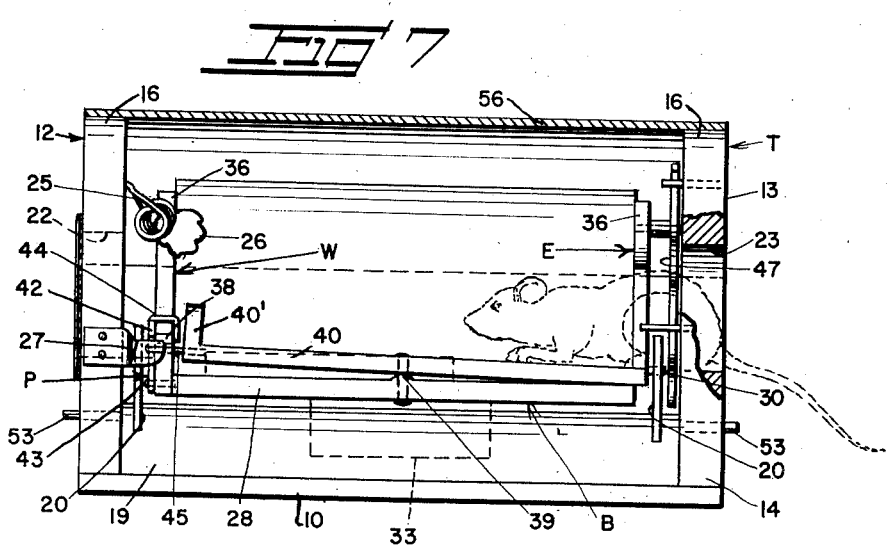
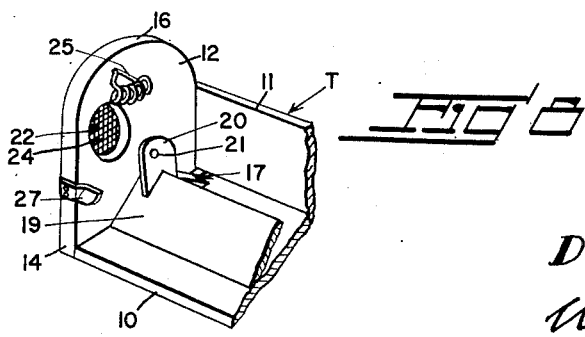

Patented June 30, 1953

2,643,480

UNITED STATES PATENT OFFICE 2,643,480

TRAP

Dan H. Jones, Lakeview, Oreg.

Application February 27, 1948, Serial No. 11,440

3 Claims. (Cl. 43—70)

My invention relates to traps and more particularly to traps to catch animals alive.

The object of my invention is to provide a trap adapted to catch animals alive without laming, crippling or wounding the animal.

Another object of my invention is to provide a trap consisting mainly of a trapping structure adapted to force a trapped animal unhurt into a cage removably secured to and normally communicating with the housing of the trapping structure.

A further object of my invention is to provide a trap of the character indicated above, wherein the trapping structure will be automatically reset, after a trapped animal is discharged into the attached cage, and will act to confine the animal after it is reset.

A still further object of my invention is to provide a trap of the character indicated above, wherein the entrance to the housing of the trapping structure is automatically closed during the time the trapped animal is being discharged by the trapping structure into the cage the latter thereafter, when reset, acting to confine the trapped animal in said cage.

Other objects of my invention not specifically mentioned may appear in the following specification describing the present invention with reference to the accompanying drawing illustrating a preferred embodiment of my invention. It is, however, to be understood that my invention is not to be limited and restricted to the exact construction and combination of parts described in the specification and shown in the drawing, but that such changes and modifications may be made which fall within the scope of the claims appended hereto.

In the several figures of the drawing similar parts are designated by similar reference characters and Figure 1 is a view in perspective of a trap constructed in accordance with an embodiment of the invention.

Figure 2 is a view in top plan of Figure 1 with the cover in fragment and in open position.

Figure 3 is a section view taken substantially on the line 3—3 of Figure 2 looking in the direction of the arrow.

Figure 4 is a sectional view taken substantially on the line 4—4 of Figure 2 looking in the direction of the arrow.

Figure 5 is a fragmentary detail view in elevation of the latch mechanism as herein comprised.

Figure 6 is a view similar to Figure 4 but showing certain of the parts in different position and the slide indicated by broken lines.

Figure 7 is a longitudinal sectional view with parts in elevation, an entering animal being indicated by broken lines.

Figure 8 is a fragmentary view in section on a reduced scale of an end portion of the trap with the lid or cover omitted.

The animal trap forming the subject matter of my invention consists of two main parts, a trap housing T and a cage C, adapted to be removably secured to the trap housing T in a manner to be described later. The trap housing T has a bottom or base board 10, which is substantially rectangular. On the longitudinal rear edge of this bottom 10 an upwardly extending rear wall 11 is secured and on each transverse end portion of the bottom 10, an upright side wall 12 and 13 respectively is mounted. The front and rear edges 14 and 15 respectively of these two side walls extend upwardly at substantially right angles to the bottom 10 and the rear edges 15 are firmly connected with the rear wall 11 and extend to the upper edge of said wall. Abutting the inner surface of each side wall, a triangular bracket 17 is secured to the upper surface of the bottom 10, so that the front edges 18 of the brackets 17 extend upwardly and rearwardly from the bottom 10. A guard plate 19 extends between the side walls 12 and 13 and is fastened to the front edges 18 of the triangular brackets 17, in abutting relation with the bottom 10. A pivot bracket 20 is secured to and extends upwardly from each triangular bracket 17 at a distance from the adjacent side wall 12 and 13 respectively. Each of the pivot brackets is provided with a bearing hole 21 and these two holes are arranged coaxially with each other and are located at a level above the upper edge of the guard plate 19 and somewhat rearwardly therefrom. In each of the side walls 12 and 13, a hole 22 and 23 respectively is provided. These two holes are arranged substantially coaxial and are of a size to permit the entrance of an animal to be trapped. The holes 22 and 23 are positioned forwardly of the guard plate 19 and at such a height, that the lowermost edge portion of each hole is located a little higher than the bearing holes 21 in the pivot brackets 20. A wire screening 24 is fastened over one of the holes 22 and 23, for instance 22, and on the inside of the corresponding side wall 12, a helical spring 25 is secured in any preferred conventional manner adjacent the hole 22 to support any kind of bait 26 to attract the animals to be trapped. It is to be understood that this bait may be supported by any other conventional means such as a hook or the like. A stationary latch finger 27 is secured to the front edge of the side wall 12, so that the finger projects beyond the inside surface of this side wall and that the upper edge of the latch finger is arranged approximately in the same plane with the center of the hole 22.

A trapping structure B is mounted within the housing T and is comprised in a rectangular platform 28, which is somewhat narrower than the housing bottom 10 and fits freely between the pivot brackets 20. A central rib 29 extends longitudinally over the upper surface of the platform and projects at both ends a short distance beyond said platform. The rib 29 has a substantially triangular cross section and from each end of the rib extends a pivot pin 30 adapted to engage one of the bearing holes 21 in one of the pivot brackets 20. On the inclined front face of the rib 29, a plate 31 is secured and extends rearwardly and upwardly so far that its upper edge 32 is located somewhat below the curved upper edges 16 of the two side walls 12 and 13, when the pivot pins 30 are positioned in the bearing holes 21. The plate 31 is approximately as long as the platform 28. To hold the platform normally in substantially horizontal position, a block 33, constituting a counter-weight, is secured on the under side of the platform 28 adjacent its rearward edge and centrally of its length. The front surface 34 of the block 33 is beveled so that the lower edge of this surface protrudes forwardly. When the trapping structure B is pivotally mounted between the two pivot brackets 20, the block 33 causes the rear edge portion of the platform 28 to swing downwardly, until its front surface 34 comes to rest against the rear surface of the guard plate 19 to hold the trapping structure in its set position.

On that end of the platform 28 which is located adjacent the side wall 12 supporting the stationary latch finger 27, an end wall W is secured. It is provided in its lower edge with a cut out 35 permitting the end of the rib 29 to extend therethrough. The portion 36 of the upper edge of the end wall W located between the plate 31 and the rear edge of the platform 28 is arcuate. The portion of the upper edge of the end wall W located forwardly from the plate 31 extends first downwardly and forwardly, as shown at 37, and then forwardly parallel to and at a higher lever than the upper surface of the platform, forming a short ledge 38. A pivot rib 39, which is substantially V-shaped in cross-section, is formed on the upper surface of the platform 28 intermediate its transverse end edges and extends from the front edge thereof to the central rib 29. A trigger plate 40 is tiltably supported on the rib 39. A movable latch, as best shown in Figures 5 and 7, P is comprised of a latch plate 41 and a catch portion 42 extending obliquely from the upper end of the forward edge of the latch plate, which is pivotally secured to the lower front corner portion of the ledge 38 by means of a pivot pin 43 projecting from said ledge. On the upper edge of the latch plate 41 rearwardly of the catch 42, a hook shaped support 44 is formed extending over the upper edge of the ledge 38 and adapted to engage said edge and thereby to hold the latch plate in position. A pin 45 extends from the end of the trigger plate 40 adjacent the ledge 38 through a slot 46 provided in the end wall W and penetrates the latch plate pivotally adjacent the rear end portion thereof.

At the end of the trigger plate 40 adjacent to the pin 45, the plate carries an upstanding wall 40' which serves to prevent an animal from seeing parts of the trigger mechanism and also prevents the animal from damaging such mechanism.

On the other end of the trapping structure B, a second end wall E is secured to the rear portion of the end edge of the platform 28 and the end edge of the plate 31. The upper edge of the end wall E is arcuate, and said end wall extends forwardly somewhat beyond the plate 31 in the shape of a horn. A closing plate 47 is pivotally mounted on the outside surface of the end wall E so that the closing plate hangs loosely downwardly by gravity for a purpose to be described later.

The cage C consists of a bottom 48 of substantially rectangular shape, and of a length equal to the overall length of the trap housing T. On each end of the cage bottom 48, a cage end wall 49 is secured to the bottom and extends upwardly therefrom to a height equal to the height of the straight front edges 14 of the trap side walls 12 and 13. A strong wire mesh M is secured to the top and front edges of the cage end walls 49 and forms the top 50 and the front wall 51 of the cage C. On the outside surface of each cage end wall 149, a clip 52 is secured and extends rearwardly beyond the corresponding end wall. A pin 53 extends outwardly from each side wall 12 and 13 of the trap housing T and is adapted to be engaged by the corresponding clip 52 to secure the cage C removably to the trap housing T. The rear of the cage is open, but is adapted to be closed by a slide 54 removably held in position on the cage by means of guides 55 secured to the rear edges of the end walls 49 of the cage.

On the upper edge of the rear wall 11 of the trap T, a cover 56 is hingedly mounted and is semi-cylindrical in form to fit over the semicircular top edges of the side walls 12 and 13 of the housing.

When the trap is set, the slide 54 is removed from the cage C and the cage is secured to the front of the trap by engaging the pin 53 with the clips 52. The cover 56 is swung open and bait 26 is secured onto the helical spring 25. The trigger plate 40 is arranged over and substantially parallel to the forward portion of the platform 28 and the latch plate 41 is pivoted downwardly by gravity so that the hook shaped support 44 rests on the upper edge of the ledge 38. The closing plate 47 hangs downwardly and is located rearwardly of the hole 23, so that this hole is open to permit an animal, which is attracted by the bait 26, to enter. The animal steps on the end portion of the trigger plate 40 adjacent the hole 23, and this trigger plate portion is forced downwardly by the weight of the animal. The other end portion of the trigger plate swings upwardly, so that the latch plate 41 is pivoted upwardly about the pivot pin 43 bringing the catch 42 into contact with the upper edge of the stationary latch finger 27, preventing the trapping structure B from pivoting in the bearing holes 21 under the weight of the animal. When the latter advances toward the bait 26, the portion of the trigger plate 40 on the other side of the pivot rib 39 and connected with the latch plate 41 by means of the pin 45, is urged downwardly so that the latch plate 41 is pivoted about the pivot pin 43, lifting the catch 42 from the latch finger 27, so that the trapping structure B is pivoted forwardly, throwing the animal on the trigger plate into the cage C. At the same time, the closing plate 47 swings into position to close the entrance hole 23. When the animal is thrown from the trigger plate 40, the weight block 33 returns the trap body B in such a position that the platform 28 is disposed substantially horizontally, the closing plate 47 is located so that the entrance hole 23 is open and the trap is reset automatically.

The animal in the cage C can not escape because the open rear side of the cage is connected only with the adjacent edges of the bottom 10 and the side walls 12 and 13, of the housing T. To remove the cage C containing the animal, the slide panel 54 is inserted in the guides 55 to close the open side of the cage and the clips 52 are disengaged from the pins 53, thus the animal is caught in the cage C without being injured or hurt in any way.

I claim:

1. An animal trap comprising a housing having side walls and end walls, one end wall having an entrance opening and a side wall having an animal discharge opening, an animal receiver communicating with the discharge opening, an elongate trapping structure in the housing and having ends adjacent to the housing end walls, pivots at the ends of and supporting the structure for tilting on a longitudinally extending axis extending parallel to said side walls, an elongate plate pivotally supported on the trapping structure to oscillate on an axis perpendicular to the first axis, a latch element pivoted on one end of the structure remote from the entrance opening and engaging a fixed keeper on an adjacent wall for securing the trapping structure in set position against tilting relative to the entrance opening, and an operative coupling between the trigger plate and said latch element acting to turn the latch element upon oscillation of the trigger plate by an animal passing over the plate pivot support from the entrance opening, to disengage the latch element from the fixed keeper, to free the trapping structure and plate for tilting as a unit on the first axis in a direction to discharge the animal toward said discharge opening.

2. An animal trap comprising a housing having side walls and end walls, one end wall having an entrance opening and a side wall having an animal discharge opening, an animal receiver communicating with the discharge opening, a trapping structure in the housing and having ends adjacent to the housing end walls, pivots supporting the structure for tilting on an axis extending parallel to said side walls, a trigger plate pivotally supported on the trapping structure to oscillate on an axis perpendicular to the first axis, a latching means for securing the trapping structure in set position against tilting relative to the entrance opening, an operative coupling between the trigger plate and the latching means acting to release the latching means upon oscillation of the trigger plate by an animal passing over the plate pivot support from the entrance opening, for the tilting of the trapping structure and plate as a unit on the first axis in a direction to discharge the animal toward said discharge opening, said latching means being adjacent to the housing end wall remote from said entrance opening, said latching means comprising a fixed element carried by the adjacent housing wall, a latch plate oscillatably mounted upon the trapping structure and engaging the fixed element, and a conecting member between the trigger plate and the latch plate whereby oscillation of the trigger plate by the weight of an animal thereon maintains the connection between the latch plate and the fixed element and opposite oscillation of the trigger plate by the animal passing over the trigger plate pivotal support effects the release of the latch plate from the fixed member.

3. The invention as defined in claim 1, with an upstanding wall carried by the trapping structure at the end adjacent to the entrance opening, an entrance opening cover plate pivotally suspended on said upstanding wall for free oscillation, the pivot for said cover plate being to one side of the entrance opening when the trapping structure is in trap set position to be moved toward the entrance opening when the trapping structure is tilted in the springing of the trap, and fixed means supported adjacent to the entrance opening for engagement by the cover plate above its pivot, upon the tilting of the trapping structure to effect movement of the cover plate to entrance opening covering position.

DAN H. JONES.

References Cited in the file of this patent

UNITED STATES PATENTS

| Number | Name | Date |
|---|---|---|
| 455,313 | Dowell | July 7, 1891 |
| 472,814 | Potter | Apr. 12, 1892 |
| 510,836 | Carpenter | Dec. 12, 1893 |
| 1,077,244 | Niebuhr | Oct. 28, 1913 |
| 1,537,763 | Gianoli | May 12, 1925 |
| 1,542,673 | Dale | June 16, 1925 |
| 1,798,717 | Baranski | Mar. 31, 1931 |
| 1,827,019 | Joseph | Oct. 13, 1931 |